US008370316B2

(12) United States Patent
Bensberg et al.

(10) Patent No.: US 8,370,316 B2
(45) Date of Patent: Feb. 5, 2013

(54) HASH-JOIN IN PARALLEL COMPUTATION ENVIRONMENTS

(75) Inventors: Christian Bensberg, Heidelberg (DE); Christian Mathis, Heidelberg (DE); Frederik Transier, Heidelberg (DE); Nico Bohnsack, Ingersleben (DE); Kai Stammerjohann, Wiesloch (DE)

(73) Assignee: SAP AG, Walldorf (DE)

( * ) Notice: Subject to any disclaimer, the term of this patent is extended or adjusted under 35 U.S.C. 154(b) by 14 days.

(21) Appl. No.: 12/978,044

(22) Filed: Dec. 23, 2010

(65) Prior Publication Data

US 2012/0011108 A1     Jan. 12, 2012

Related U.S. Application Data

(60) Provisional application No. 61/363,304, filed on Jul. 12, 2010.

(51) Int. Cl.
*G06F 7/00* (2006.01)

(52) U.S. Cl. .......................................... 707/696; 707/747

(58) Field of Classification Search .......... 707/696–701, 707/747, 745, 763, 954; 711/216; 370/395.32, 370/536
See application file for complete search history.

(56) References Cited

U.S. PATENT DOCUMENTS

| 5,742,806 | A * | 4/1998 | Reiner et al. .......................... 1/1 |
| 2005/0044102 | A1 * | 2/2005 | Gupta et al. ................... 707/102 |
| 2006/0117036 | A1 | 6/2006 | Cruanes et al. |
| 2006/0218123 | A1 * | 9/2006 | Chowdhuri et al. .............. 707/2 |
| 2006/0288030 | A1 * | 12/2006 | Lawrence .................... 707/101 |
| 2007/0250470 | A1 * | 10/2007 | Duffy et al. ....................... 707/2 |
| 2008/0301124 | A1 * | 12/2008 | Alves et al. ....................... 707/5 |
| 2009/0089560 | A1 * | 4/2009 | Liu et al. ....................... 712/226 |
| 2011/0010358 | A1 * | 1/2011 | Zane et al. .................... 707/714 |

OTHER PUBLICATIONS

Shimin Chen et al., "Improving Hash Join Performance Through Prefetching", Mar. 30-Apr. 2, 2004, Proceedings of the 20th International Conference on Data Engineering (ICDE 2004), Boston, MA, IEEE Computer Society, 12pgs.

Peter Boncz et al., "Database Architecture Optimized for the new Bottleneck: Memory Access", Proceedings of the 25th VLDB Conference, Edinburgh, Scotland, 1999, The VLDB Journal, 9(3), 16pgs.

"Hash table", Wikipedia, retrieved date Dec. 23, 2010, download from http://en.wikipedia.org/wiki/Hash_table, 14pgs.

Philip Garcia et al., "Hash-Join Algorithms on Modern Multithreaded Computer Architectures", in CF '06: Proceedings of the 3rd Conference on Computing Frontiers, 2006, ACM, 13pgs.

(Continued)

*Primary Examiner* — James Trujillo
*Assistant Examiner* — Linh Black
(74) *Attorney, Agent, or Firm* — Buckley, Maschoff & Talwalkar LLC

(57) ABSTRACT

According to some embodiments, a system and method for a parallel join of relational data tables may be provided by calculating, by a plurality of concurrently executing execution threads, hash values for join columns of a first input table and a second input table; storing the calculated hash values in a set of disjoint thread-local hash maps for each of the first input table and the second input table; merging the set of thread-local hash maps of the first input table, by a second plurality of execution threads operating concurrently, to produce a set of merged hash maps; comparing each entry of the merged hash maps to each entry of the set of thread-local hash maps for the second input table to determine whether there is a match, according to a join type; and generating an output table including matches as determined by the comparing.

16 Claims, 7 Drawing Sheets

OTHER PUBLICATIONS

K. Kitsuregawa et al., "Application of Hash to Data base Machine and its Architecture", New Generation Comput., 1(1), 1983, 12pgs.

M. Seetha Lakshmi et al., "Limiting Factors of Join Performance on Parallel Processors", Data Engineering, 1989, Proceedings Fifth International Conference on Los Angeles, CA USA Feb. 6-10, 1989, Washington, DC, USA, IEEE Comput. Soc. Pr, US, Feb. 6, 1989, XP010015200, DOI: 10.1109/ICDE.1989.47254, ISBN: 978-0-8186-1915-1, (pp. 488-496, total 9 pages).

Xiaofang Zhou et al., "A Dynamic Approach for Handling Data Skew Problems in Parallel Hash Join Computation", Proceedings of the Region Ten Conference (Tencon), Beijing, Oct. 19 -21, 1993, IEEE Tencon '93/Bejing, XP010113474, DOI: 10.1109/Tencon.1993.319946, ISBN: 978-0-7803-1233-3, (pp. 133-137, total 5 pages).

Communication: European Search Report, dated Apr. 2, 2012, for European Patent Application No. 11005361.8-2201, 8pgs.

* cited by examiner

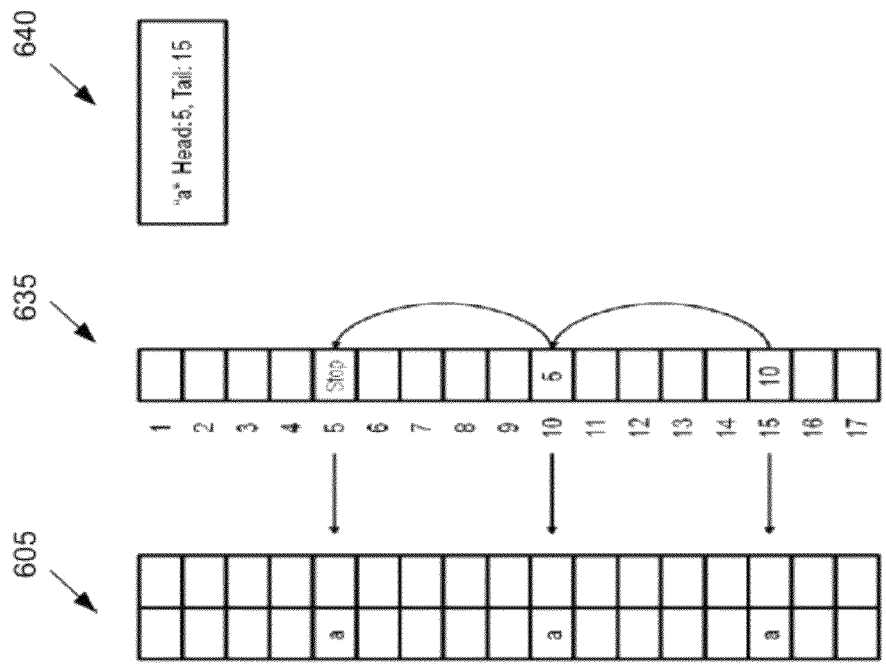
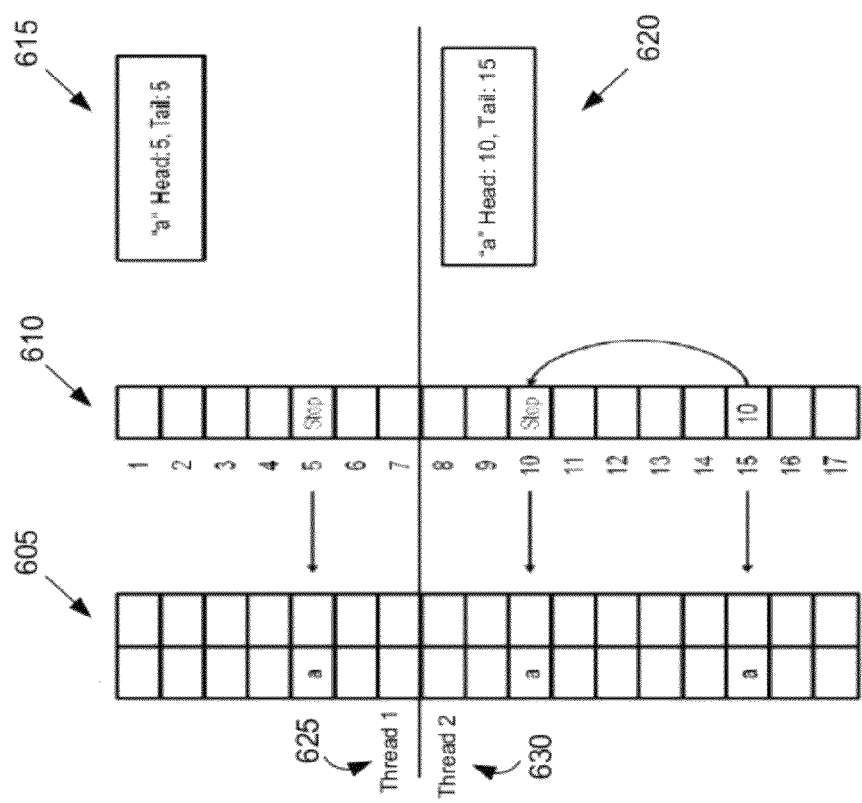

HASH-JOIN IN PARALLEL COMPUTATION ENVIRONMENTS

FIELD

Some embodiments relate to a data structure. More specifically, some embodiments provide a method and system for a data structure and use of same in providing a relational data join operation in parallel computing environments.

BACKGROUND

A number of presently developed and developing computer systems include multiple processors in an attempt to provide increased computing performance. Advances in computing performance, including for example processing speed and throughput, may be provided by parallel computing systems and devices as compared to single processing systems that sequentially process programs and instructions.

For parallel join processes, a number of approaches have been proposed. However, the previous approaches each include sequential operations and/or synchronization operations such as, locking, to avoid inconsistencies or lapses in data coherency. Thus, prior proposed solutions for parallel join operations and processes in parallel computation environments with shared memory either contain a sequential step(s) and/or require some sort of synchronization on the data structures.

Accordingly, a method and mechanism for efficiently processing join processes in parallel computation environments are provided by some embodiments herein.

BRIEF DESCRIPTION OF THE DRAWINGS

FIGS. 6A and 6B provide illustrative examples of data structures, in accordance with some embodiments herein.

DETAILED DESCRIPTION

In an effort to more fully and efficiently use the resources of a particular computing environment, a data structure and techniques of using that data structure may be developed to fully capitalize on the design characteristics and capabilities of that particular computing environment. In some embodiments herein, a data structure and techniques for using that data structure (i.e., algorithms) are provided for efficiently using the data structure disclosed herein in a parallel computing environment with shared memory.

As used herein, the term parallel computation environment with shared memory refers to a system or device having more than one processing unit. The multiple processing units may be processors, processor cores, multi-core processors, etc. All of the processing units can access a main memory (i.e., a shared memory architecture). All of the processing units can run or execute the same program(s). As used herein, a running program may be referred to as a thread. Memory may be organized in a hierarchy of multiple levels, where faster but smaller memory units are located closer to the processing units. The smaller and faster memory units located nearer the processing units as compared to the main memory are referred to as cache.

Figure 1:
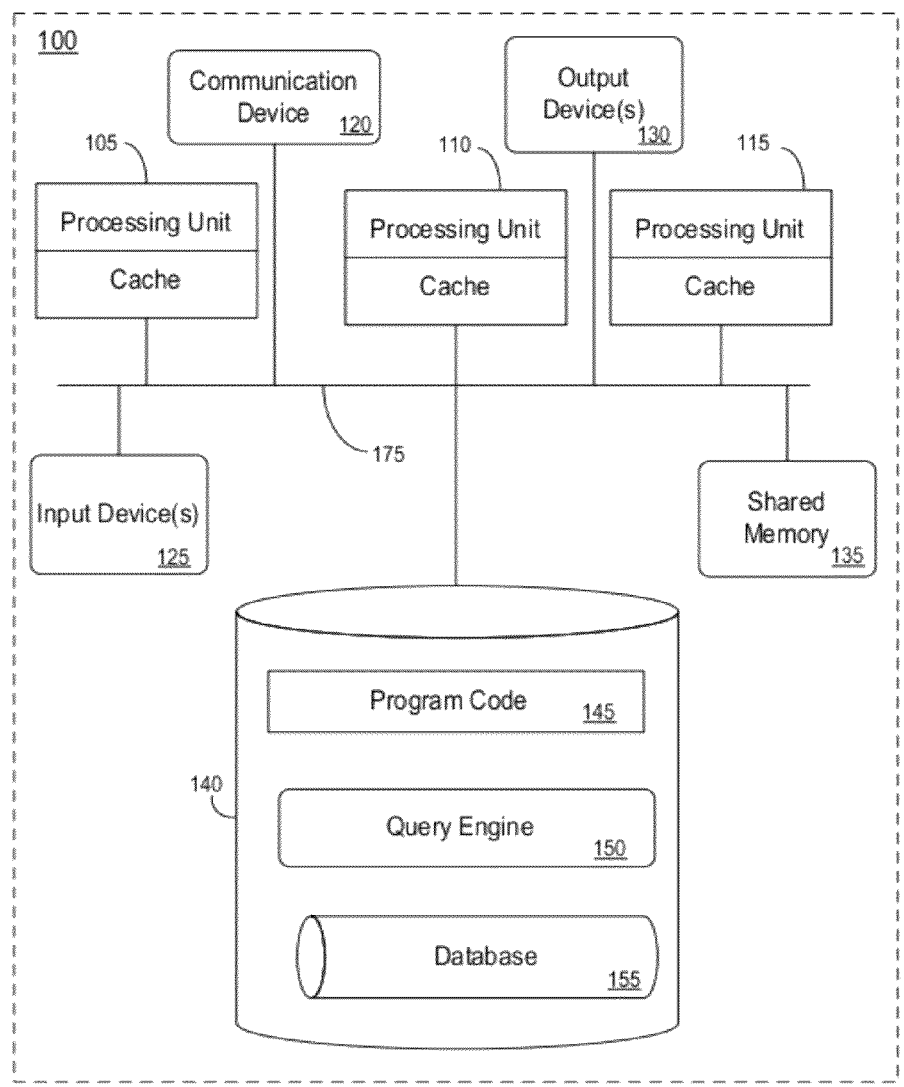
FIG. 1 is block diagram of a system according to some embodiments.

FIG. 1 is a block diagram overview of a device, system, or apparatus 100 that may be used in a providing an index hash table or hash map in accordance with some aspects and embodiments herein, as well as providing a parallel join process based on such data structures. System 100 may be, for example, associated with any of the devices described herein and may include a plurality of processing units 105, 110, and 115. The processing units may comprise one or more commercially available Central Processing Units (CPUs) in form of one-chip microprocessors or a multi-core processor, coupled to a communication device 120 configured to communicate via a communication network (not shown in FIG. 1) to a end client (not shown in FIG. 1). Device 100 may also include a local cache memory associated with each of the processing units 105, 110, and 115 such as RAM memory modules. Communication device 120 may be used to communicate, for example, with one or more client devices or business service providers. System 100 further includes an input device 125 (e.g., a mouse and/or keyboard to enter content) and an output device 130 (e.g., a computer monitor to display a user interface element).

Processing units 105, 110, and 115 communicates with a shared memory 135 via a system bus 175. System bus 175 also provides a mechanism for the processing units to communicate with a storage device 140. Storage device 140 may include any appropriate information storage device, including combinations of magnetic storage devices (e.g., a hard disk drive), optical storage devices, and/or semiconductor memory devices for storing data and programs.

Storage device 140 stores a program 145 for controlling the processing units 105, 110, and 115 and query engine application 150 for executing queries. Processing units 105, 110, and 115 may perform instructions of the program 145 and thereby operate in accordance with any of the embodiments described herein. For example, the processing units may concurrently execute a plurality of execution threads to build the index hash table data structures disclosed herein. Furthermore, query engine 150 may operate to execute a parallel join operation in accordance with aspects herein in cooperation with the processing units and by accessing database 155. Program 145 and other instructions may be stored in a compressed, uncompiled and/or encrypted format. Program 145 may also include other program elements, such as an operating system, a database management system, and/or device drivers used by the processing units 105, 110, and 115 to interface with peripheral devices.

In some embodiments, storage device 140 includes a database 155 to facilitate the execution of queries based on input table data. The database may include relational data tables, data structures (e.g., index hash tables), rules, and conditions for executing a query in a parallel computation environment such as that of FIGS. 1 and 2.

In some embodiments, the data structure(s) disclosed herein as being developed for use in parallel computing environments with shared memory is referred to as a parallel hash table. In some instances, the parallel hash table may also be referred to as a parallel hash map. In general, a hash table may be provided and used as index structures for data storage to enable fast data retrieval. The parallel hash table disclosed herein may be used in a parallel computation environment where multiple concurrently executing (i.e., running) threads insert and retrieve data in tables. Furthermore, a hash-join algorithm that uses the parallel hash tables herein is provided for computing a join in a parallel computation environment.

Figure 2:
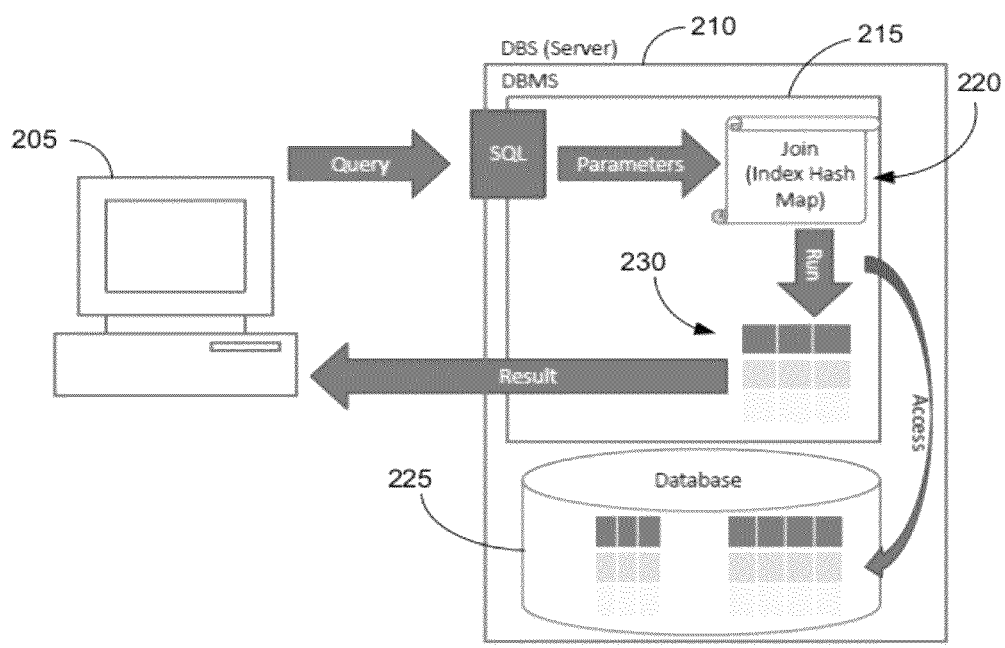
FIG. 2 is a block diagram of an operating environment according to some embodiments.

FIG. 2 provides an illustrative example of a computation environment 200 compatible with some embodiments herein. While computation environment 200 may be compatible with some embodiments of the data structures and the methods herein, the data structures and the methods herein are not limited to the example computation environment 200. Processes to store, retrieve, and perform operations on data may be facilitated by a database system (DBS) and a database warehouse (DWH).

As shown in FIG. 2, DBS 210 is a server. DBS 210 further includes a database management system (DBMS) 215. DBMS 215 may comprise software (e.g., programs, instructions, code, applications, services, etc.) that controls the organization of and access to database 225 that stores data. Database 225 may include an internal memory, an external memory, or other configurations of memory. Database 225 may be capable of storing large amounts of data, including relational data. The relational data may be stored in tables. In some embodiments, a plurality of clients, such as example client 205, may communicate with DBS 210 via a communication link (e.g., a network) and specified application programming interfaces (APIs). In some embodiments, the API language provided by DBS 210 is SQL, the Structured Query Language. Client 205 may communicate with DBS 115 using SQL to, for example, create and delete tables; insert, update, and delete data; and query data.

In general, a user may submit a query from client 205 in the form of a SQL query statement to DBS 210. DBMS 215 may execute the query by evaluating the parameters of the query statement and accessing database 225 as needed to produce a result 230. The result 230 may be provided to client 205 for storage and/or presentation to the user.

One type of query is a join query. The join query may operate to combine fields from two tables by using values common to each table. As will be explained in greater detail below, a parallel join algorithm, process, or operation may be used to compute SQL joins. In general with reference to FIG. 2, some embodiments herein may include client 205 wanting to join the data of two tables stored in database 225 (e.g., a user at client 205 may desire to know all customers who bought a certain product). Client 205 may connect to DBS 210 and issue a SQL query statement that describes the join. DBMS 215 may create a executable instance of the parallel join algorithm herein, provide it with the information needed to run the parallel join algorithm (e.g., the name of tables to access, columns to join, etc.), and run the parallel join operation or algorithm. In the process of running, the parallel join algorithm herein may create an index hash map 220 to keep track of intermediate result data. An overall result comprising a result table may be computed based on the index hash map(s) containing the intermediate results. The overall parallel join result may be transmitted to client 205.

As an extension of FIG. 2, DWHs may be built on top of DBSs. Thus, a use-case of a DWH may be similar in some respects to DBS 210 of FIG. 2.

The computation environment of FIG. 2 may include a plurality of processors that can operate concurrently, in parallel and include a device or system similar to that described in FIG. 1. Additionally, the computation environment of FIG. 2 may have a memory that is shared amongst the plurality of processors, for example, like the system of FIG. 1. In order to fully capitalize on the parallel processing power of such a computation environment, the data structures used by the system may be designed, developed or adapted for being efficiently used in the parallel computing environment.

A hash table is a fundamental data structure in computer science that is used for mapping "keys" (e.g., the names of people) to the associated values of the keys (e.g., the phone number of the people) for fast data look-up. A conventional hash table stores key—value pairs. Conventional hash tables are designed for sequential processing.

However, for parallel computation environments there exists a need for data structures particularly suitable for use in the parallel computing environment. In some embodiments herein, the data structure of an index hash map is provided. In some aspects, the index hash map provides a lock-free cache-efficient hash data structure developed to parallel computation environments with shared memory. In some embodiments, the index hash map may be adapted to column stores.

In a departure from conventional hash tables that store key—value pairs, the index hash map herein does not store key—value pairs. The index hash map herein generates key—index pairs by mapping each distinct key to a unique integer. In some embodiments, each time a new distinct key is inserted in the index hash map, the index hash map increments an internal counter and assigns the value of the counter to the key to produce a key—index pair. The counter may provide, at any time, the cardinality of an input set of keys that have thus far been inserted in the hash map. In some respects, the key—index mapping may be used to share a single hash map among different columns (or value arrays). For example, for processing a plurality of values distributed among different columns, the associated index for the key has to be calculated just once. The use of key—index pairs may facilitate bulk insertion in columnar storages. Inserting a set of key—index pairs may entail inserting the keys in a hash map to obtain a mapping vector containing indexes. This mapping vector may be used to build a value array per value column.

Figure 3:
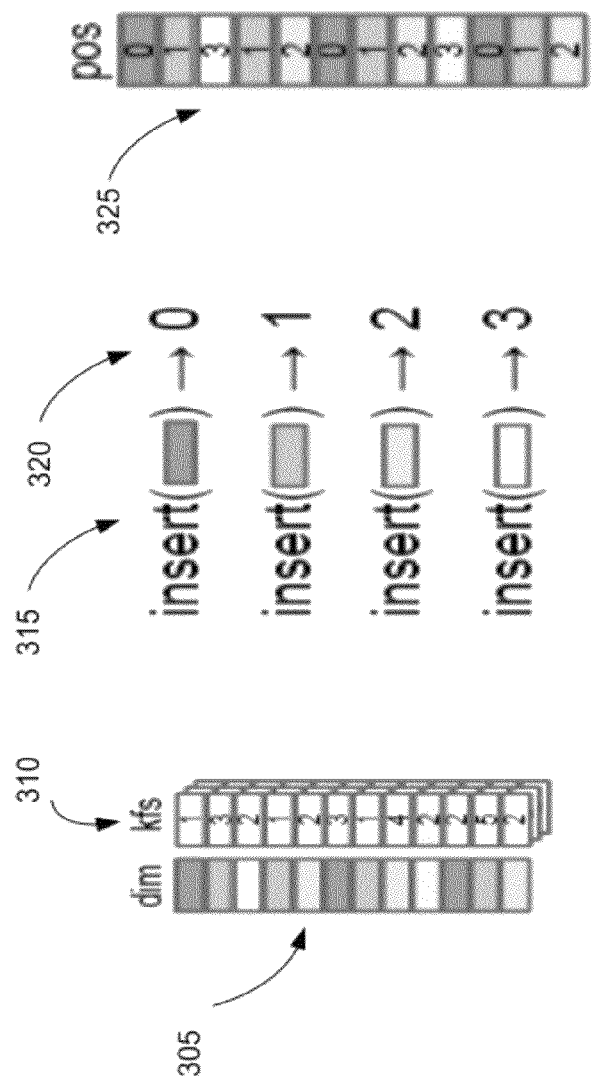
FIGS. 3A-3C are illustrative depictions of various aspects of a data structure according to some embodiments.

Referring to FIGS. 3A-3C, input data is illustrated in FIG. 3A including a key array 305. For each distinct key 315 from key array 305, the index hash map returns an index 320 (i.e., a unique integer), as seen in FIG. 3B. When all of the keys, from a column for example, have been inserted in the hash map, the mapping vector 325 of FIG. 3C results. To achieve a maximum parallel processor utilization, the index hash maps herein may be designed to avoid locking when being operated on by concurrently executing threads by producing wide data independence. In some embodiments, index hash maps herein may be described by a framework defining a two step process. In a first step, input data is split or separated into equal-sized blocks and the blocks are assigned to worker execution threads. These worker execution threads may produce intermediate results by building relatively small local hash tables or hash maps. The local hash maps are private to the respective thread that produces it. Accordingly, other threads may not see or access the local hash map produced by a given thread.

In a second step, the local hash maps including the intermediate results may be merged to obtain a global result by concurrently executing merger threads. When accessing and processing the local hash maps, each of the merger threads may only consider a dedicated range of hash values. The merger threads may process hash-disjoint partitions of the local hash maps and produce disjoint result hash tables that may be concatenated to build an overall result.

Figure 4:
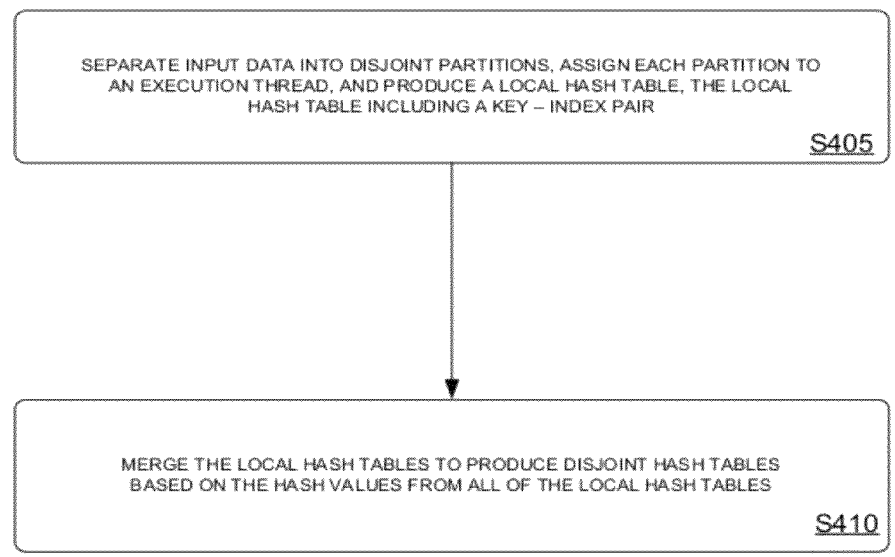
FIG. 4 is a flow diagram of a method relating to a data structure, according to some embodiments herein.

FIG. 4 is a flow diagram related to a data structure framework 400, in accordance with some embodiments herein. At S405, an input data table is separated or divided into a plurality of partitions. The size of the partitions may relate to or even be the size of a memory unit such as, for example, a cache associated with parallel processing units. In some embodiments, the partitions are equal in size. Furthermore, a first plurality of execution threads running in parallel may each generate a local hash table or hash map. Each of the local hash maps is private to the one of the plurality of threads that generated the local hash map.

The second step of the data structure framework herein is depicted in FIG. 4 at S410. At S410, the local hash maps are merged. The merging of the local hash maps produces a set of disjoint result hash tables or hash maps.

In some embodiments, when accessing and processing the local hash maps, each of the merger threads may only consider a dedicated range of hash values. From a logical perspective, the local hash maps may be considered as being partitioned by their hash value. One implementation may use, for example, some first bits of the hash value to form a range of hash values. The same ranges are used for all local hash maps, thus the "partitions" of the local hash maps are disjunctive. As an example, if a value "a" is in range 5 of a local hash map, then the value will be in the same range of other local hash maps. In this manner, all identical values of all local hash maps may be merged into a single result hash map. Since the "partitions" are disjunctive, the merged result hash maps may be created without a need for locks. Additionally, further processing on the merged result hash maps may be performed without locks since any execution threads will be operating on disjunctive data.

In some embodiments, the local (index) hash maps providing the intermediate results may be of a fixed size. Instead of resizing a local hash map, the corresponding worker execution thread may replace its local hash map with a new hash map when a certain load factor is reached and place the current local hash map into a buffer containing hash maps that are ready to be merged. In some embodiments, the size of the local hash maps may be sized such that the local hash maps fit in a cache (e.g., L2 or L3). The specific size of the cache may depend on the sizes of caches in a given CPU architecture.

In some aspects, insertions and lookups of keys may largely take place in cache. In some embodiments, overcrowded areas within a local hash map may be avoided by maintaining statistical data regarding the local hash maps. The statistical data may indicate when the local hash map should be declared full (independent of an actual load factor). In some aspects and embodiments, the size of a buffer of a computing system and environment holding local hash maps ready to be merged is a tuning parameter, wherein a smaller buffer may induce more merge operations while a larger buffer will necessarily require more memory.

In some embodiments, a global result may be organized into bucketed index hash maps where each result hash map includes multiple fixed-size physical memory blocks. In this configuration, cache-efficient merging may be realized, as well as memory allocation being more efficient and sustainable since allocated blocks may be shared between queries. In some aspects, when a certain load factor within a global result hash map is reached during a merge operation, the hash map may be resized. Resizing a hash map may be accomplished by increasing its number of memory blocks. Resizing of a bucketed index hash map may entail repositioning the entries of the hash map. In some embodiments, the maps' hash function may be chosen such that its codomain increases by adding further least significant bits if needed during a resize operation. In an effort to avoid too many resize operations, an estimate of a final target size of the map may be determined before an actual resizing of the hash map.

In some embodiments, the index hash map framework discussed above may provide an infrastructure to implement parallelized query processing algorithms or operations. One embodiment of a parallelized query processing algorithm includes a hash-based (equi-)join, as will be discussed in greater detail below.

In some embodiments, a join algorithm herein is hash-based. This hash-based join algorithm may be used to combine two input tables. In accordance with some aspects and embodiments, the input tables are hashed by multiple execution threads using the index hash table framework described hereinabove. Since the result tables of the index hash tables are disjoint, all subsequent processing steps performed on the disjoint result tables can be executed in parallel by one thread per partition without a need to use locks.

In some embodiments, the resulting table may not be constructed by copying all values to their final positions in the columns. Instead, the resulting table may be a virtual table. The virtual table may hold references to the original columns and have a vector of all rows that match each other, according to the join type being performed. Upon access to a row, a call to do so may be routed transparently to the respective row of the original column. A benefit of the virtual result is that it is not necessary to copy the data.

In some embodiments, the hash-based join algorithm and methods herein use a data allocation and organization method that does not need to know the number of distinct values in advance.

In an effort to fully utilize the resources of parallel computing environments with shared memory, a join operation should be computed and determined in parallel. In an instance the join is not computed in parallel, the processing performance for the join would be bound by the speed of a single processing unit instead of being realized by the multiple processing units available in the parallel computing environment.

Figure 5:
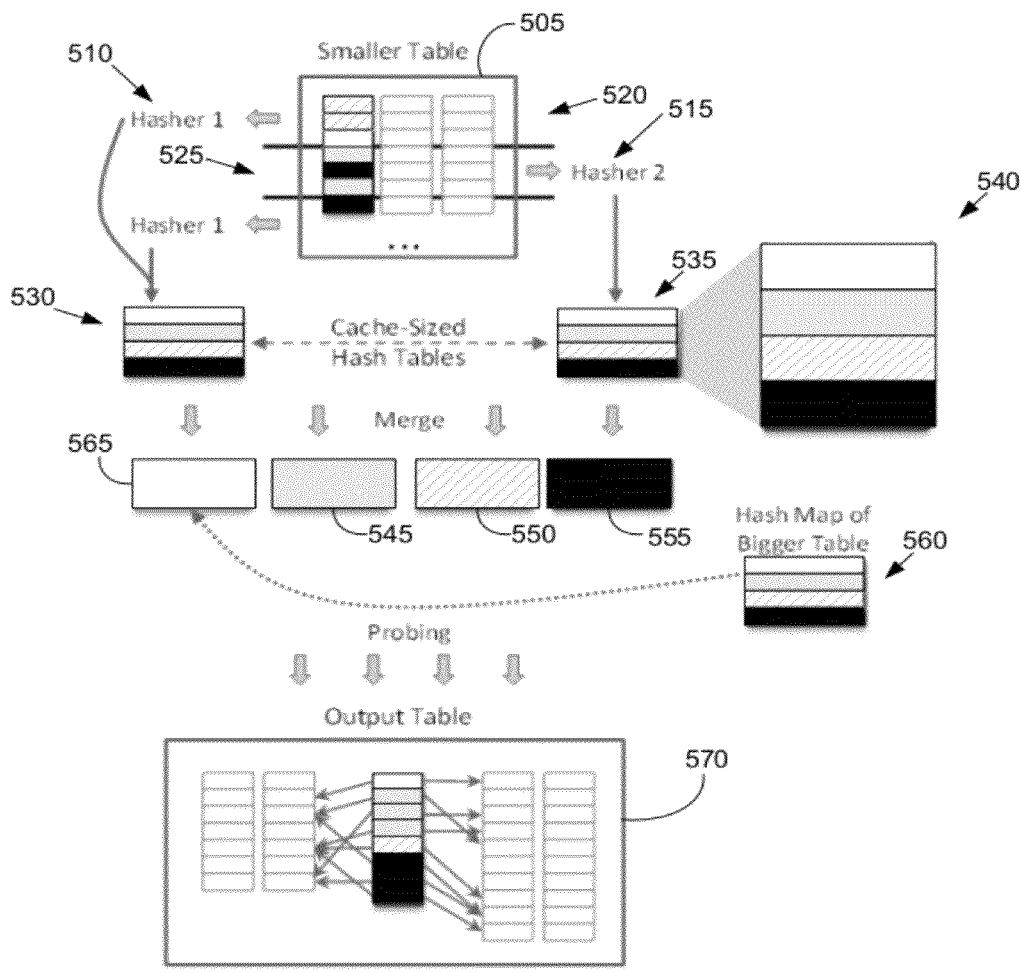
FIG. 5 is an illustrative depiction of a parallel join flow, in some embodiments herein.

FIG. 5 is an illustrative depiction of a parallel hash-based join flow, according to some embodiments herein. In some aspects, the parallel join flow 500 uses the index hash table framework discussed hereinabove. In the example of FIG. 5, two degrees of parallelism are depicted and are achieved by the concurrent execution of two execution threads 510 and 515. However, the concepts conveyed by FIG. 5 may be extended to additional degrees of parallelism, including computation environments now known and those that become known in the future.

In FIG. 5, two input tables are hashed using the index hash table framework. For purposes of clarity, only one of the two input tables is depicted in FIG. 5 since the hashing of the input tables is the same for each input table. As an initial step, multiple concurrently running execution threads calculate hash values for the join columns of both tables. The join columns are the columns specified in a join statement (e.g., a SQL join query statement). These hash values are inserted into thread-local hash maps, in accordance with the index hash table framework discussed above. One set of thread-local hash maps are produced for the smaller table 505 and one, 560, for the bigger table (not shown). As illustrated in FIG. 5, the input table is divided into partitions, such as, partitions 520 and 525, and a plurality of execution threads 510, 515 operate to produce disjoint local thread hash maps 530, 535. The hash map for the second, bigger input table is provided at 560 and is similar to the hash maps 530, 535. In addition to providing key—index pairs, the thread local hash maps also include the row number or row identifier of the original column corresponding to the value referenced by each hash map entry.

Proceeding with the flow of the join operation in FIG. 5, the thread local hash maps 530, 535 of the smaller table are merged into one hash map per partition. This aspect may be accomplished in some embodiments by one thread per core operating to merge all partitions that belong to each other into a single hash map. Merged hash tables for the smaller input table 505 are depicted at 545, 550, and 560. The merging of the thread local hash maps of the smaller table may be accomplished by a plurality of execution threads operating in parallel.

In the example of FIG. 5, the set of hash maps 560 of the bigger input table are not merged. Each entry of the bigger table hash maps are probed against or compared to the merged hash maps of the smaller table. If a match is found, then both tables have rows to be joined with each other.

However, while there is a match between the hash maps, the matched rows each have a different identifier. Therefore, the matched rows are aligned or otherwise reconciled so that all corresponding rows of both tables can be retrieved by using a single identifier. In an instance a value exists only in one of the two tables, then it is kept only if one of the outer join types (e.g., left outer, right outer, full outer) are being performed.

Based on the row identifiers determined for the matches, an output table 570 may be generated. For example, all matching rows are added to the output table 570. In an instance of outer joins, the lines without matches but satisfying the outer join operation are added to the output table 570 as well, with the addition of a NULL indicator.

In some embodiments, the hash maps of the bigger (or second) input table may be merged instead of the smaller (first) input table or in addition to the merging of the smaller (first) input table. Turning to a discussion of the data structures used in some embodiments herein, it is again noted that each entry in a hash map refers to the row in the original columns where the corresponding value is stored (i.e., the row number is stored with the hash map entries). However, the number of distinct values in a column is unknown. Therefore, it is not possible to pre-allocate a "reasonable" amount of memory in advance. Moreover, hash maps are merged and therefore the rows to which entries in the hash maps refer to have to be merged as well if two hash maps store the same value. A data structure 600 capable of accommodating these concerns is illustrated in FIGS. 6A and 6B.

The data structure of FIG. 6A includes an array 610 as well as head and tail records 615 and 620 which are accessed through the index given by the hash map framework. FIG. 6A shows a line through input table 605 indicating that the input table is partitioned and each part is processed by one of the execution threads 625 and 630. Each execution thread processes a (not necessarily consecutive) portion of input table 605 and fills the corresponding part of array 610.

For each input table 605, an integer array 610 is allocated. Each field number of array 610 corresponds to a row in input table 605. For each entry in a hash map, head and tail values are stored that describe starting and end points in that array. As an example, if the single value "a" is in row 5 of an input table, thread 625 produces a stop indicator stored at field 5 of the array. The position "5" is stored as head and tail values for the hash map value "a". When all positions of value "5" are queried, the tail is used to access the array. Position 5 is the first matching row of the input table. Since the position 5 contains only the stop indicator, it is known that only row 5 has the value "a".

In the instance more than one row of an input table has a certain value, each field in the array having the particular value will store the row number of the next field containing that value. For example, rows 10 and 15 operated on by thread 630 store the value "a" in the input table 605. In data structure 620, "15" will be stored as the tail value and "10" is stored as the head value. In the array 610, field 15 will store "10" and field 10 will store a stop indicator. To retrieve all rows where value "a" is stored, rows 15 and 10 can be retrieved by following the references in the array 610. FIG. 6A provides an illustrative depiction of an example of two data structures 615 and 620 that store head and tail values. When two hash maps are merged and both store the same value, the sequences in the array have to be merged as well. FIG. 6B provides an illustrative depiction of a merged array 635 according to some embodiments herein, where the two sequences produced by the two threads 625 and 630 have been merged. The merging of the two data structures 615 and 620 results in the combined data structure 640 with one head value and one tail value. Array 635 reflects the merging. The head and tail values for the merged data structures are updated so that they point to the new head and tail of the combined sequences.

As described above, including the discussion of FIG. 5, the hash-based parallel join algorithm herein includes the phases of (1) hashing the smaller table, (2) hashing the bigger table, (3) merging the hash maps of the smaller table, (4) probing the entries of hash maps for the bigger table against the merged hash maps, and (5) building the output table.

Figure 7:
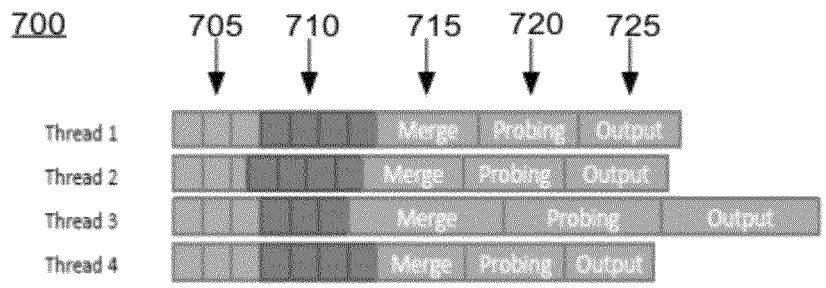
FIGS. 7-9 relate to threading operations, according to some embodiments herein.

In some embodiments, the two input tables may be hashed in any order. Therefore, (worker/hasher) threads can process parts of the input tables in any logical order to create the hash maps for the input tables. In some embodiments, the hash maps of the bigger table may be created after a process of merging the hash maps for the smaller table. FIG. 7 provides an illustrative depiction of a threading scenario 700. In this example, parts of the smaller input table are hashed at 705, parts of the larger input table are hashed at 710, and then the hash maps of the smaller input table are merged at 715. Thereafter, the merged hash maps of the smaller input table and the hash maps of the bigger input table are probed at 720, followed by the building of the output table at 725.

In order to hash the two input tables, execution threads pick up parts (e.g., chunks) of data and create hash maps. This results in two separate sets of hash maps, one set for each input table. Each hash map is then partitioned. In some embodiments, as many parts are created as cores are available in a parallel computation system (e.g., FIG. 1, system 100). After the partitioning of the hash tables, all subsequent steps are then executed for all parts that belong to each other.

In some aspects, a thread for a specific part considers all parts of all input hash maps, merges the parts of the required hash maps, probes the values and builds the output table. As an example, consider a system with 32 processing cores. In this example, 32 threads may be started to hash the input tables. When all input tables are hashed, the thread for, as an example, part 4 considers all hash maps of the smaller input tables and merges their part 4 into a new hash map which is then dedicated for all values for part 4. Thread 4 then considers part 4 of each hash map of the bigger table. The part 4 portions of the bigger input table are then probed against the part 4 portions of the merged hash map. Then, the thread builds the output of part 4.

In some embodiments, each part (i.e., partitioned portion) has approximately the same size since the hash function may equally distribute values. However, the sizes may still differ based on the input data.

Figure 8:
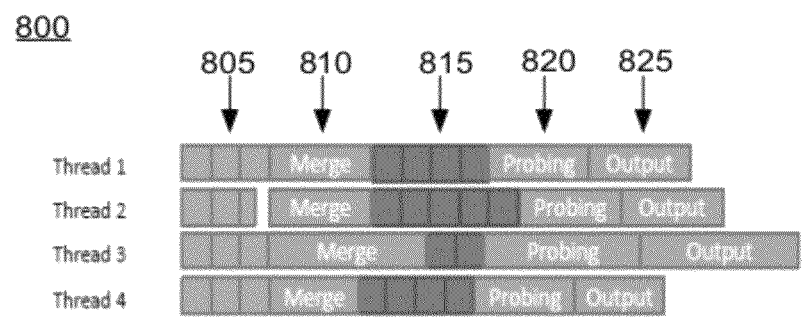

The process steps of merging, probing and building the output table are closely coupled since each process step cannot start before a previous step has finished. Therefore, it may be advantageous to start directly merging the smaller table hash maps when the hash maps are built. If one part being hashed is smaller than the other parts being hashed in parallel, the responsible thread may use the time freed by processing of the smaller part of the smaller table to hash the bigger table. This aspect is illustrated in FIG. 8 where threading scenario 800 illustrates the merging process step 810 is executed after the hashing of the smaller table at 805 and before the bigger table is hashed at 815. When all parts are merged at 810, the threads each get part of the bigger table and start hashing them at 815 until no portions of the bigger table remain un-hashed. The threads then proceed with the probing phase at 820.

In both FIGS. 7 and 8, thread 3 has the longest runtime. The processing finishes when all threads are done. The total runtime in FIG. 8 is shorter than in FIG. 7. Thus, modifying the order of executing the phases may have a positive impact on the overall runtime if the extra time for a bigger part is longer than the time that is required to hash a portion of the input table.

The earliest time permissible to start the merging of the smaller table hash tables is right after all of the hash maps for the smaller table are created. This is illustrated in FIG. 8 at 830 that includes a white gap (i.e., no processing activity) for thread 2. In such a case, the gap in time in processing of the smaller table may be used for hashing a chunk of the bigger table. Since merging should start as early as possible, the chunk size is reduced in this case.

The threading task distribution may be further optimized. For example, the size of a part may be determined during the merge phase. If the part of the smaller table is bigger due to the distribution of values by the hash function, it is likely that the parts of the bigger table will also be bigger. However, even if this is not the case, the probing and output phase may take longer due to the bigger merged tables. Therefore, the amount of chunks or portions of the bigger table processed by the thread that handles the bigger parts can be reduced.

Figure 9:
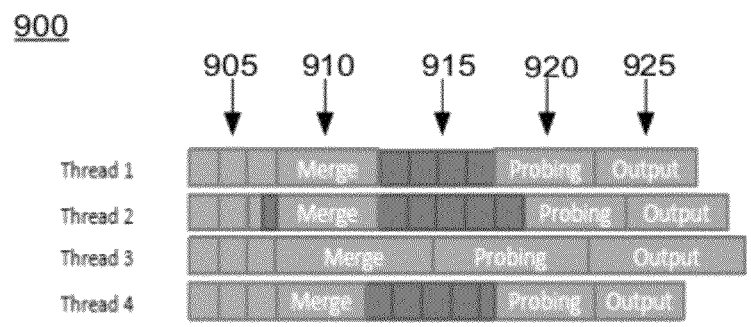

FIG. 9 includes a number of optimizations, including hashing and merging the smaller table before hashing of the bigger table and processing a portion of the bigger table by a thread during a period of otherwise inactivity. As shown, the total runtime is shorter as the thread that takes the most time, thread 3, does not hash any chunks of the bigger table under the optimization scenario 900 of FIG. 9.

Each system described herein may be implemented by any number of devices in communication via any number of other public and/or private networks. Two or more of the devices herein may be co-located, may be a single device, or may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
calculating, by a plurality of concurrently executing execution threads, hash values for join columns of a first input table and a second input table;
storing the calculated hash values in a set of disjoint thread-local hash maps for each of the first input table and the second input table as key—index pairs where each key of the key—index pairs that is distinct is mapped to a unique integer, the key of the key—index pairs being extracted from the partitions of the first and second input tables and the index of the key—index pairs comprising one of the unique integers, the storing including storing a row number of the join columns of the first or second input table corresponding to an associated value stored-for each of the key—index pairs hash map entry;
merging the set of thread-local hash maps of the first input table, by a second plurality of execution threads operating concurrently, to produce a set of merged hash maps, each of the second plurality of execution threads responsible for a dedicated range of all of the thread-local hash maps;
comparing each entry of the merged hash maps to each entry of the set of thread-local hash maps for the second input table to determine whether there is a match, according to a join type; and
generating an output table including matches as determined by the comparing.

2. The method of claim 1, wherein the join columns and the join type are specified by a join query statement.

3. The method of claim 1, wherein the join type may be one of an inner join, an outer join, a left-outer join, and a right-outer join.

4. The method of claim 1, wherein the first input table is smaller than the second input table.

5. The method of claim 1, wherein the second input table is smaller than the first input table.

6. The method of claim 1, further comprising aligning the row number of the matches to facilitate retrieval of all corresponding rows from both the first input table and the second input table.

7. The method of claim 1, wherein the set of thread-local hash maps of the second input table is merged instead of or in addition to the merging of the set of the thread-local hash maps of the first input table.

8. The method of claim 1, wherein all of the calculating and storing of hash values and the merging is completed before a start of the comparing.

9. The method of claim 1, further comprising partitioning each of the thread-local hash maps to facilitate a determination of the dedicated range of all of the thread-local hash maps each of the second plurality of execution threads is responsible.

10. A system, comprising:
a plurality of processing units;
a shared memory accessible by all of the plurality of processing units;
a database; and
a query engine to execute a query, the query execution comprising:
calculating, by a plurality of concurrently executing execution threads, hash values for join columns of a first input table and a second input table;

storing the calculated hash values in a set of disjoint thread-local hash maps for each of the first input table and the second input table as key—index pairs where each key of the key—index pairs that is distinct is mapped to a unique integer, the key of the key—index pairs being extracted from the partitions of the first and second input tables and the index of the key—index pairs comprising one of the unique integers, the storing including storing a row number of the join columns of the first or second input table corresponding to an associated value stored-for each of the key—index pairs;

merging the set of thread-local hash maps of the first input table, by a second plurality of execution threads operating concurrently, to produce a set of merged hash maps, each of the second plurality of execution threads responsible for a dedicated part of all of the thread-local hash maps;

comparing each entry of the merged hash maps to each entry of the set of thread-local hash maps for the second input table to determine whether there is a match, according to a join type; and generating an output table including matches as determined by the comparing.

11. The system of claim 10, wherein the join columns and the join type are specified by a join query statement.

12. The system of claim 10, wherein the join type may be one of an inner join, an outer join, a left-outer join, and a right-outer join.

13. The system of claim 10, wherein the first input table is smaller than the second input table.

14. The system of claim 10, wherein the second input table is smaller than the first input table.

15. The system of claim 10, wherein the query engine further aligns the row number of the matches to facilitate retrieval of all corresponding rows from both the first input table and the second input table.

16. The system of claim 10, wherein the set of thread-local hash maps of the second input table is merged instead of or in addition to the merging of the set of the thread-local hash maps of the first input table.

* * * * *